Patented May 29, 1945

2,377,158

UNITED STATES PATENT OFFICE 2,377,158

PROCESS FOR PREPARING CHLORO-INDANTHRONES

David X. Klein, Wilmington, Del., assignor to E. I. du Pont de Nemours & Company, Wilmington, Del., a corporation of Delaware No Drawing. Application August 7, 1943, Serial No. 497,872

2 Claims. (Cl. 260—265)

This invention relates to an improvement in the process for preparing chlorinated indanthrones, and has for its object the manufacture of 3,3'-dichloro-N-dihydro-anthraquinone azines (3,3'-dichloroindanthrone) by a simple and economical process which gives the desired product in high yields and in a high state of purity.

Although a number of processes have been described for the chlorination of indanthrone, it has been found difficult to obtain a product of satisfactory bleach fastness and yet one that would have good solubility in the vat by the direct chlorination. While a very pure 3,3'-dichloroindanthrone can be produced by direct synthesis from 1-bromo-2-amino-3-chloro-anthraquinone, such process is not as economical as desired, due to the cost of synthesizing the intermediate, and since the 3,3'-dibromoindanthrone can be prepared more economically in high yields and of high purity from the less expensive 1,3-dibromo-2-amino-anthraquinone and the bromine atoms in the molecule can be readily replaced by chlorine, this method offers advantages over the direct synthesis of the 3,3'-dichloroindanthrone. However, in the replacement of the bromine in the dibromoindanthrone, it is difficult, by the known processes, to remove all the bromine present without causing the introduction of additional chlorine in other positions in the indanthrone molecule, which is undesirable.

I have found that the bromine in the 3,3'-dibromoindanthrone can be replaced substantially quantitatively if chlorination of the 3,3'-dibromoindanthrone (3,3'-dibromo - N - dihydro-anthraquinone azine) is carried out with chlorine gas in an inert high boiling solvent at temperatures of from 200° to 220° C. The solvent should be one which resists the action of chlorine and bromine at these high temperatures and which will have only slight solvent action on the dichloro-anthraquinone azine produced in the reaction. Solvents such as nitrobenzenes, chlorinated benzenes and chlorinated naphthalenes which permit a temperature of at least 200° C. may be employed. The use of trichlorobenzene is preferred because of its high boiling point and because it does not readily dissolve the final product. The product isolated from the chlorination is in the yellow "azine" form, which may be readily reduced to the blue "N-dihydro form."

The following example is given to illustrate the invention. The parts used are by weight.

Example 1

Into a glass-lined reactor equipped with a thermometer, agitator, reflux condenser and gas-inlet tube, 1600 parts of trichlorobenzene and 200 parts of 3,3'-dibromo-N-dihydro-anthraquinone azine (3,3'-dibromoindanthrone) are placed, and the suspension is heated to from 200° to 220° C. At that temperature chlorine gas is introduced at such a rate that little trichlorobenzene is swept into the condenser. After a short time bromine fumes are evolved and carried out through the condenser with the hydrogen chloride and excess chlorine. The reaction is complete in from 4 to 8 hours, when microscopic examination shows no blue needles to be present in the yellow needles of the dichloro-anthraquinone azine. After cooling to room temperature, the product, 3,3'-dichloro-anthraquinone azine, is filtered off, washed with 500 parts of trichlorobenzene and then with 200 parts of methanol.

Any further adherent solvent may be removed by steam distillation. To the finely divided product suspended in 3500 parts of water at 40° C., there is added 225 parts of sodium chloride and then a solution of 150 parts of caustic soda and 150 parts of sodium hydrosulfite in 750 parts of water. After stirring at 40°–50° C. for two hours, 150 parts of m-nitrobenzene sodium sulfonate in 500 parts of water is added, and the slurry is heated at 60° C. for one hour. After filtering at this temperature, the cake is washed with water until alkali-free and dried.

A yield of 150 parts of bromine-free 3,3'-dichloro-N-dihydro-anthraquinone azine is obtained, having a chlorine content of 13.5%–14.5%.

If desired, the so-obtained product may be further purified by dissolving in strong sulfuric acid and re-precipitating by diluting to 83% to 90% strength.

The temperature employed should be above 200° C., preferably between 215° and 220° C. Temperatures as high as 260° C. may be used. Low temperatures tend to produce higher halogenation products, as described in British Patent 330,217. The presence of iron in the reaction is undesirable since it catalyzes the halogenation of the solvent and decomposition of the product. It is therefore preferred to limit the amounts of iron present as much as possible.

In this process the dichlorobenzene which is removed from an earlier reaction may be employed, without distillation, as the reaction medium for the chlorination of the other dibromoindanthrone.

It is found that at the high temperatures employed in this reaction substantially no chlorine is introduced into the molecule other than that which replaces the bromine in the 3,3'-positions, and the bromine is substantially quantitatively removed.

I claim:

1. In the process for preparing 3,3'-dichloroindanthrone in which 3,3'-dibromoindanthrone is reacted with chlorine gas in an inert organic reaction medium, the steps which comprise effecting complete replacement of the bromine by chlorine and without the introduction of any substantial amount of chlorine into the molecule, other than that which replaces the bromine in the 3,3'-positions, by carrying out the chlorination of the 3,3'-dibromoindanthrone at temperatures above 200° C., and isolating the bromine-free, substantially pure 3,3'-dichloroindanthrone.

2. In the process for preparing 3,3'-dichloroindanthrone in which 3,3'-dibromoindanthrone is reacted with chlorine gas in an inert organic reaction medium, the steps which comprise effecting complete replacement of the bromine by chlorine and without the introduction of any substantial amount of chlorine into the molecule, other than that which replaces the bromine in the 3,3'-positions, by carrying out the chlorination of the 3,3'-dibromoindanthrone at temperatures of from 215° to 220° C., and isolating the bromine-free, substantially pure 3,3'-dichloroindanthrone.

DAVID X. KLEIN.